US006877664B1

(12) United States Patent
Oliva

(10) Patent No.: US 6,877,664 B1
(45) Date of Patent: Apr. 12, 2005

(54) DEVICE AND OPTICAL ELEMENT FOR THE AIMING AND THE VISUAL INDICATION OF READING AREA OF A CODED INFORMATION READER

(75) Inventor: Guido M. Oliva, Rovigo (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/688,170

(22) Filed: Oct. 16, 2000

(30) Foreign Application Priority Data

Jul. 11, 2000 (EP) .......................................... 00830488

(51) Int. Cl.[7] ................................................ G06K 7/10
(52) U.S. Cl. ............................. 235/462.42; 235/462.2
(58) Field of Search ..................... 235/462.2, 462.21, 235/462.22, 462.35, 462.42, 462.45

(56) References Cited

U.S. PATENT DOCUMENTS

| | | | | |
|---|---|---|---|---|
| 5,254,853 A | * | 10/1993 | Reich .......................... | 250/221 |
| 5,296,689 A | * | 3/1994 | Reddersen et al. ..... | 235/462.21 |
| 5,321,717 A | * | 6/1994 | Adachi et al. .............. | 372/100 |
| 5,378,883 A | * | 1/1995 | Batterman et al. .......... | 235/455 |
| 5,500,702 A | * | 3/1996 | Meyers ....................... | 352/131 |
| 5,572,368 A | * | 11/1996 | Yokota et al. .............. | 359/710 |
| 5,627,360 A | | 5/1997 | Rudeen | |
| 6,060,722 A | * | 5/2000 | Havens et al. ........... | 235/462.2 |

FOREIGN PATENT DOCUMENTS

| | | | | |
|---|---|---|---|---|
| EP | 0 524 029 | | 1/1993 | |
| EP | 997760 A1 | * | 5/2000 | ........... G02B/27/00 |
| WO | WO 9816896 A1 | * | 4/1998 | ............ G06K/7/10 |

* cited by examiner

Primary Examiner—Diane I. Lee
(74) Attorney, Agent, or Firm—Nixon & Vanderhye, P.C.

(57) ABSTRACT

A device for the aiming and the visual indication of a reading area of a coded information reader includes an emitter which emits a preferably collimated light beam towards a reading area of a coded information reader, as well as a refractive optical element. The refractive optical element deflects at least one first portion of the light beam so as to generate at least two different beam portions active on at least two different zones of the reading area along at least two different optical paths. The refractive optical element includes opposed first and second faces which respectively collect the light beam and project the at least two beam portions onto the reading area. The second face includes at least one (preferably more than one) first surface portion inclined by a predetermined angle α with respect to the first face and adapted to deflect the at least one first light beam portion by a predetermined deflection angle β with respect to the optical axis Z. The device is adapted to be mounted on a coded information reader to provide the operator with a visual indication of the reading area framed by the reader, before carrying out the reading of the information contained in the area.

28 Claims, 8 Drawing Sheets

DEVICE AND OPTICAL ELEMENT FOR THE AIMING AND THE VISUAL INDICATION OF READING AREA OF A CODED INFORMATION READER

BACKGROUND

1. Field of the Invention

The present invention relates to a device and an optical element for the aiming and the visual indication of a reading area of a coded information reader. More in particular, the invention relates to a device and an optical element for aiming a reading area of a coded information reader (preferably, but not exclusively, a portable reader) for providing the operator with a visual indication of the reading area framed by the reader so as to optimise the subsequent reading operations.

The invention also relates to a coded information reader comprising an aiming device of the type described above.

2. Related Art and Other Considerations

As known, in recent years coded information readers (for example optical, magnetic and radiofrequency readers) have been proposed on the market, which are capable of localising and decoding the information contained on a support (for example, an optical, magnetic or electronic code associated to an object) placed into a predetermined reading area so as to acquire the information.

In this description and following claims, the expression "coded information reader" indicates any device capable of acquiring information relating to an object (for example distance, volume, overall dimensions, or its identification data) through the acquisition and the processing of a luminous, magnetic or radio frequency signal diffused by the same object. The expression "coded information" indicates optical, magnetic and electronic codes. The expression "optical code" indicates any graphical representation having the function of storing a coded information. A particular example of optical code comprises linear or two-dimensional codes, wherein the information is coded through suitable combinations of dark-coloured elements (usually black) having a predetermined shape, for example square, rectangular or hexagonal, separated by clear elements (spaces, usually white), such as bar codes, stacked codes, and two-dimensional codes in general, color codes, etc. Moreover, the expression "optical code" also comprises, more in general, other graphical shapes having the function of coding the information, including characters printed in clear (letters, numbers, etc.) and particular patterns (such as for example, stamps, logotypes, signatures, fingerprints, etc.). The expression "optical code" also comprises graphical representations that are detectable not only in the field of visible light, but also in the wave band comprised between infrared and ultraviolet.

Typically, coded information readers comprise static or dynamic means for illuminating the reading area containing the code to be read with a luminous, magnetic or radio frequency flux, means for collecting the luminous, magnetic or radio frequency flux emitted by said area, means for converting said luminous, magnetic or radio frequency flux into an analogue or digital electric signal, and means for processing said electric signal so as to extract the information contained in the code.

For the purpose of facilitating the arrangement of the reader with respect to the reading area, thus guaranteeing a correct reading of the information contained therein, it is very important to make the operator aware of the position and the extension of the area framed by the reader. For this purpose, devices for the aiming and/or the visual indication of the reading area framed by optical readers have been developed. Such devices are typically adapted to be mounted into the optical readers in a more or less misaligned position with respect to the reader optical axis.

Aiming optical devices are known which are capable of providing the operator with a visual indication of the framed area through the identification of the center and/or the edges, or of the outline, or of a combination of them, of the area framed by the reader.

For example, European patent application no. 98830656.9 by the same Applicant describes an optical device comprising a plurality of illumination groups, each one including a luminous source, a diaphragm having a predetermined profile, and a converging lens arranged, in the optical emission path, downstream of the diaphragm and adapted to collimate the light beam coming from the diaphragm and project it onto an end portion of the reading area. This device provides for the use of more luminous sources (typically, LED or laser sources), each one adapted to illuminate a corresponding end portion of the reading area. Nevertheless, the use of more sources unavoidably increases the size and cost of the aiming device. Size and cost increase are often undesirable, particularly in portable optical readers.

The U.S. Pat. No. 5,500,702 describes an optical device comprising an holographic (HOE) or diffractive (DOE) optical element arranged downstream of a laser source and of a collimation lens, and adapted to deflect the collected light beam so as to project a plurality of different light beams onto different end portions of the reading area. The device of U.S. Pat. No. 5,500,702 uses a single luminous source for illuminating more end portions of the reading area.

A first drawback associated to a device of the type described above relates to the high cost and to the construction difficulty of the holographic and/or diffractive optical elements used. These drawbacks are essentially due to the difficulty of realizing, on their surface, grooves of minimum sizes. Such sizes depend on the divergence to be imparted to the various light beams, and they decrease as the beam divergence increases.

In fact, it is desirable that the area framed by the aiming device corresponds to the area framed by the reader at all reading distances. Particularly for relatively wide reading ranges (for example, wider than 30°), it is possible to obtain such a divergence with a diffractive (DOE) or holographic (HOE) element by reducing the minimum sizes of the grooves up to about 1 $\mu$m or less for greater view angles, as it results from the calculation example reported below.

In fact, in a first approximation, it is possible to calculate the minimum size of the grooves on the surface of an HOE or DOE with the same design rules as used for diffraction gratings. With $\theta$ representing half the field of view angle of the reader, $\lambda$ the wavelength of the incident radiation on the DOE (HOE) and d the minimum size of the groove, the expression for $\lambda$ is given by the following relation:

$$\lambda = 2d \cdot \sin \theta$$

From this relation it results that, for a field of view of $2\theta$ equal to 30° and an incident radiation $\lambda$ equal to 650 nm, the minimum size d of the groove must be equal to 1.26 $\mu$m, that is to say, very small.

A second drawback associated with a device of the type described above relates to the fact that, for using a DOE (HOE), it is necessary to have a coherent source (laser source). As is known, coherent sources are particularly expensive.

The technical problem at the basis of the present invention is that of providing an aiming device which should be, at the same time, economic and easily constructed, yet also for sufficiently high divergence angles, and capable of providing the operator with a clear and precise indication of the framed reading area, independently of the distance at which the latter is with respect to the same device.

SUMMARY

Thus, in a first aspect thereof, the present invention relates to a device for the aiming and the visual indication of a reading area of a coded information reader, comprising:
  means for emitting a light beam;
  means for deflecting at least one first portion of said light beam so as to generate at least two different beam portions active on at least two different zones of a reading area of a coded information reader along at least two different optical paths;
characterised in that said means for deflecting at least one portion of said light beam consists of a refractive optical element.

Advantageously, according to the present invention, the visual indication of the reading area framed by the reader can be achieved by deviating one or preferably more portions of the light beam emitted by the luminous source through a refractive optical element suitably orientated with respect to the emission optical axis. Thus, the light beam is split by said refractive optical element into more beam portions and each portion is projected on the reading area (preferably, on its vertices and centre) along different optical paths.

Even more advantageously, the aiming device of the present invention is more economic and simple, from the constructive point of view, than the aiming devices of the prior art provided with diffractive or holographic optical elements; in fact, the manufacture of a refractive optical element is much simpler and much more economic than that of a diffractive or holographic optical element, as the realisation of grooves on the surface of the refractive optical element is not required.

Advantageously, the aiming device of the invention provides for the use of a single emission source for the illumination and/or indication of more zones of the reading areas; this allows to limit the size of the device of the invention, which will thus be more compact than the aiming devices of the prior art comprising more emission sources. Even more advantageously, the aiming device of the invention is capable of correctly operating with emission sources of any type, that is to say, with both coherent sources (laser sources) and incoherent sources (LED).

Preferably, the emission source used in the aiming device of the invention is a LED. Even more preferably, for the purpose of obtaining wide depths of field and a spot correctly focused on the reading area, the LED is followed by a collimation lens; the use of a LED allows to limit the production and/or sales costs of the device of the invention, which will thus be more economic than the aiming devices of the prior art comprising laser sources.

Preferably, the refractive optical element comprises opposed first and second faces, respectively for collecting the light beam and projecting said at least two beam portions on said reading area, wherein an optical axis Z is defined into said refractive optical element, and said second face comprises at least one first portion of surface inclined by a predetermined angle $\alpha$ with respect to said first face and adapted to deflect said at least one first portion of light beam by a predetermined deflection angle $\beta$ with respect to said optical axis Z.

Advantageously, the deflection of each portion of the light beam is carried out through an optical prism suitably orientated in space; even more advantageously, the various prisms are incorporated into a single optical element. According to the present invention, each optical prism is arranged so as to be impinged by only a portion of the light beam that will thus be deflected by the predetermined angle for illuminating and/or indicating a vertex of the reading area of the coded information reader.

Preferably, the refractive optical element also comprises means for transmitting without any deflection at least one second portion of collimated light beam towards the reading area. Even more preferably, this means are provided, into the refractive optical element, centrally with respect to the above first inclined surface portions.

In a first embodiment of the aiming device of the present invention, the means for transmitting without any deflection said at least one second portion of light beam towards the reading area consists of at least one second surface portion of the refractive optical element which is substantially plane and parallel to the first collecting face of the light beam (perpendicular to the optical axis z). On the contrary, in a second embodiment of the aiming device of the invention, the means for the transmitting without any deflection said at least one second portion of light beam consists of a through hole extended between the first and the second faces, and coaxially formed with respect to said optical axis Z. Advantageously, in both the embodiments described above the beam portion that is not collected by the inclined surface portions of the refractive optical element (and thus, the beam portion affecting the above plane surface portion parallel to the collecting face of the light beam, or the above through hole) remains undeflected, and identifies the centre of the reading area.

In a preferred embodiment of the device of the present invention, the second face comprises two first surface portions, each one inclined by a predetermined angle with respect to the first face and adapted to deflect a corresponding portion of light beam by a predetermined deflection angle with respect to the optical axis Z. Such device allows the identification and/or visual indication of the framed reading area through the visual indication of two of its opposed margins (and optionally, of the centre of the same area); this is particularly advantageous in the reading of linear optical codes (for example, bar codes).

In a particularly preferred embodiment of the device of the present invention, the second face comprises four first surface portions, each one inclined by a predetermined angle with respect to the first face and adapted to deflect a corresponding portion of light beam by a predetermined deflection angle with respect to the optical axis Z, so as to define, in the refractive optical element, a poly-prismatic structure having a substantially pyramidal shape with a rhomboidal base. In substance, in this case the refractive optical element consists of four suitably orientated prisms that are reciprocally associated; each inclined surface portion is thus identified by a prism, and it is adapted for the identification and/or the indication of an opposed vertex of the reading area. Thus, such device allows the identification and/or indication of the reading area through the visual indication of four of its vertices (and optionally, of the centre of the same area); this is particularly advantageous in the reading of two-dimensional optical codes and images.

Alternatively, the pyramidal structure can be realised so that the four prisms forming it are orientated so as to form the negative of a pyramid; in this case, each inclined surface portion is adapted for the identification and/or the indication of a corresponding vertex of the reading area.

As said above, advantageously, in the preferred embodiment described above the various inclined prismatic surfaces are integrated into a single optical element having a pyramidal structure, easy to manufacture through moulding in optically transparent plastic. In this case, the means for transmitting without any deflection said second beam portion can be realised by simply removing a portion of the refractive optical element at the pyramid vertex, or by forming a through hole longitudinally extended between the first and the second face of the refractive optical element.

In an alternative embodiment of the aiming device of the present invention, the refractive element has a cross section smaller than the cross section of the light beam taken at the first face of the refractive optical element. Advantageously, in this case the portion of light beam which exceeds the input section of the refractive optical element proceeds as undeflected and identifies the centre of the framed reading area, whereas the central portions of the beam that impinge on the refractive optical element are deviated so as to identify the margins of the reading area; it is thus possible to obtain a visual indication of the margins and of the centre of the reading area without carrying out the above operations for removing the pyramid vertex or forming the longitudinal hole.

In a variant of the device of the present invention, the above collimation lens is fixedly associated with the refractive optical element at said first collecting face of the collimated light beam, or even, it is part of the same refractive optical element, thus forming a single optical element that carries out both functions.

According to a further variant of the device of the invention, the second face comprises at least one first peripheral surface portion inclined by a predetermined angle $\alpha_1$ with respect to said first face and adapted to deflect said at least one first portion of light beam by a predetermined deflection angle $\beta_1$ with respect to said optical axis Z, and at least one second central surface portion, inclined by a predetermined angle $\alpha_2$, different from $\alpha_1$, with respect to said first face and adapted to deflect said at least one portion of light beam by a predetermined deflection angle $\beta_2$, different from $\beta_1$ with respect to said optical axis Z. In this way, it is advantageously possible to realise, through a single refractive optical element, two different deflection angles; the aiming device is thus capable of identifying two different zones of the reading area, a more internal one (identified by the surface portions having a smaller deflection angle) useful for close-up reading of high-density codes, and a more external one (identified by the surface portions having a larger deflection angle), useful for a distance reading of medium-low density codes.

Advantageously, by increasing the number of inclined faces of the refractive optical element it is possible to increase the number of zones or points identified on the reading area; for example in this way it is advantageously possible to identify, besides the vertices of the framed reading area, also the median points of the outline of said area.

According to a particularly preferred embodiment, the device of the present invention also comprises an amplitude mask adapted to impart a predetermined profile to the beam portions projected on the reading area. Preferably, the amplitude mask is arranged between the emission source (and/or the collimation lens) and the refractive optical element; alternatively, in any case, it can also be provided upstream of the collimation lens, although this requires more alignment difficulties.

Preferably, the inclined surface portions of the refractive optical element are substantially plane and all of the various deflection angles are equal to each another. Alternatively, the inclined surface portions of the refractive optical element can be substantially cylindrical and convex. In this last case, the device of the invention preferably comprises a divergent lens arranged upstream of each inclined surface portion of the refractive optical element. An aiming device of this type allows generating a plurality of orthogonal lines (for example four in case the refractive optical element has four inclined surface portions), so as to identify almost the entire edge of the framed reading area.

Preferably, the various divergent lenses are operatively associated to the refractive optical element so as to define a single optical element.

In a second aspect thereof, the present invention relates to an optical element for the aiming and the visual indication of a reading area of a coded information reader, comprising means for deflecting at least one first portion of a light beam so as to generate at least two beam portions adapted to be projected on at least two different zones of a reading area along at least two different optical paths, characterised in that said element is a refractive optical element. Such optical element, when mounted in an aiming device of the type described above, allows to achieve all the advantages mentioned above with reference to said device.

In a third aspect thereof, the present invention relates to an optical apparatus for reading information in a reading area, characterised in that it comprises an aiming device and/or an optical element of the type described above. Thus, said reader exhibits all of the advantages mentioned above with reference to the aiming device of the present invention.

BRIEF DESCRIPTION OF THE DRAWINGS

Further features and advantages of the present invention will appear more clearly from the following detailed description of some preferred embodiments, made with reference to the attached drawings. In such drawings.

DETAILED DESCRIPTION

Figure 1:
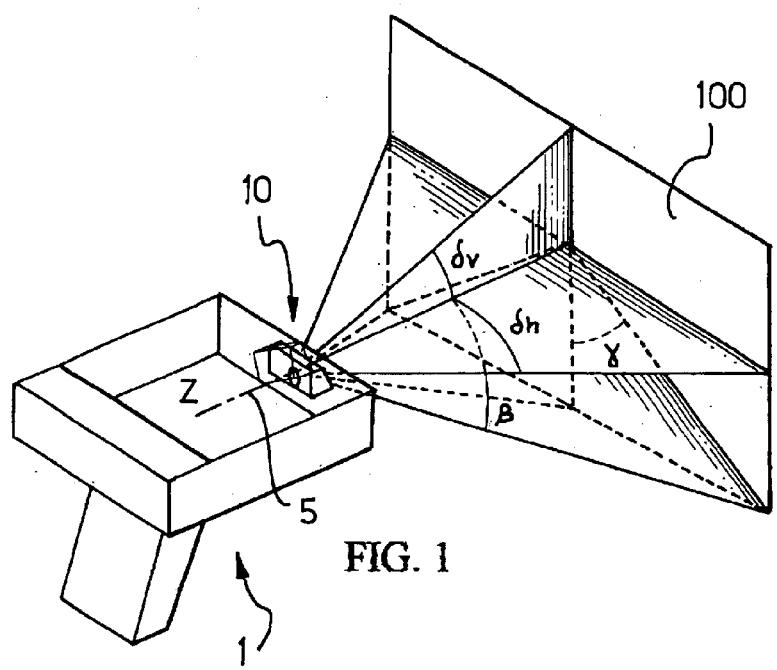
FIG. 1 shows a schematic perspective view of a reader including an aiming device according to the present invention with highlighted its characteristic optical angles.

In FIG. 1, reference numeral 1 schematically indicates a coded information reader comprising a device for the aiming and/or the visual indication of a reading area 100 framed by the reader 1, according to the present invention. The reader 1 is preferably a conventional portable coded information reader. Thus, in the present description, reference shall be made to the constructive details of the aiming device of the invention mounted into the reader 1, instead of reader 1 as a whole.

The aiming device of the invention comprises, in particular, an emission source (not illustrated) of a collimated light beam with a substantially circular or elliptical shape (indicated with reference numeral 5). The emission source, which can be of any type (such as for example, a laser source, a LED or a lamp) is preferably followed by a collimation lens (also not illustrated) so that, downstream of the emission source, a collimated light beam 5 is defined. The optical axis intersects the reading area 100 in a central point. In a variant of the aiming device of the invention, the emitted light beam can be uncollimated.

Moreover, downstream of the emission source (and optionally, of the collimation lens) the aiming device of the invention comprises a refractive optical element 10. The refractive optical element 10 has an optical axis Z and adapted to deflects by a predetermined angle β (with respect to the optical axis Z), one or more portions of the collimated light beam 5 coming from the emission source so as to generate two or more different beam portions active on respective different zones of the reading area 100 along different optical paths.

The refractive optical element 10 can be realized according to different embodiments, all suitable for achieving the purposes of the present invention. Some representative ones of the embodiments shall be described in detail hereinafter.

In a preferred embodiment, the refractive optical element 10 of the present invention splits the collimated light beam 5 into at least five different portions, directing at least four of the different portions to the four margins of the reading area 100 along different optical emission paths. The remaining portion (e.g. fifth portion) identifies the center of reading area 100.

In theory, the deflection of each beam portion 5 is carried out through a respective suitably orientated optical prism. From a practical point of view, the various prisms are incorporated into a single optical element having poly-prismatic structure and a substantially pyramidal shape with rhomboidal base. This single optical element is one embodiment of the refractive optical element 10 of the present invention.

Figure 1A:
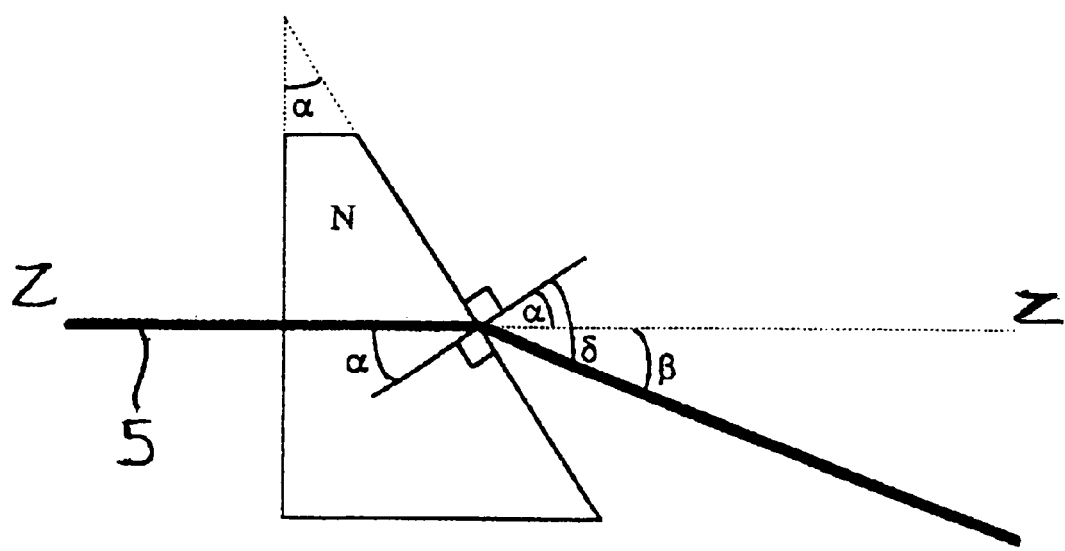
FIG. 1a shows a schematic view of a section of a constructive detail of an optical element incorporated in the device of FIG. 1 with highlighted the characteristic geometrical axes and angles.

FIG. 1 schematically shows one of the prisms adapted to be incorporated in the device and/or refractive optical element 10 of the invention. From a theoretical point of view, it is possible to calculate the inclination angle α of each prism adapted to deflect a respective beam portion 5 by a predetermined angle β so as to illuminate and/or indicate a vertex of the framed reading area. With reference to FIGS. 1 and 1a, with the horizontal $\delta_h$ and vertical $\delta_v$ view angles of the reader being known, the calculation of angle β is based on the following relation:

$$\tan \beta = \sqrt{\tan^2(\delta_h) + \tan^2(\delta_v)}$$

As:

$$\beta = \delta - \alpha = arcsin[N \cdot \sin\alpha] - \alpha$$

where N is the refraction index of the material of the prism, and angle β being known, it is possible to obtain the angle at vertex α of the prism. Moreover, it is possible to obtain the orientation of the prism with respect to the optical axis Z so that an incident collimated light bean is deflected so as to univocally identify one of the vertices of the reading area 100, represented in FIG. 1 by angle γ by which it must be rotated with respect to axis Z. In fact, the angle γ is expressed by the following relation:

$$\cos\gamma = \frac{\tan\delta_v}{\tan\beta}$$

To identify the other three vertices of the reading area 100, it is sufficient to add three more prisms rotated by −γ, γ+180°, −(γ+180°).

From the structural point of view, as already mentioned, the four prisms adapted to deflect the four beam portions for indicating the four margins or extremes of the reading area 100 are advantageously integrated in a single refractive optical element 10 having poly-prismatic structure and substantially pyramidal shape, with rhomboidal base. The since refractive optical element is easy to manufacture through moulding of optically transparent plastic.

FIGS. 2 to 7, 9 and 10 show various embodiments of the refractive optical element 10 of the present invention. In all embodiments proposed herein, in the refractive optical element 10 there are defined a first face 11 for collecting the collimated light beam coming from the emission source and a second face 12 for projecting the various portions of light beam onto the reading area 100. In particular, the second face 12 comprises a plurality of portions of prismatic surfaces (all indicated with 13), preferably plane, inclined by angle α with respect to the first face 11. The surface portions 13 are adapted to generate the beam portions 5 adapted to identify the margins or vertices of the reading area 100. Preferably, all surface portions 13 are inclined by the same angle α with respect to the first face 11 of the refractive optical element 10.

Figure 2:
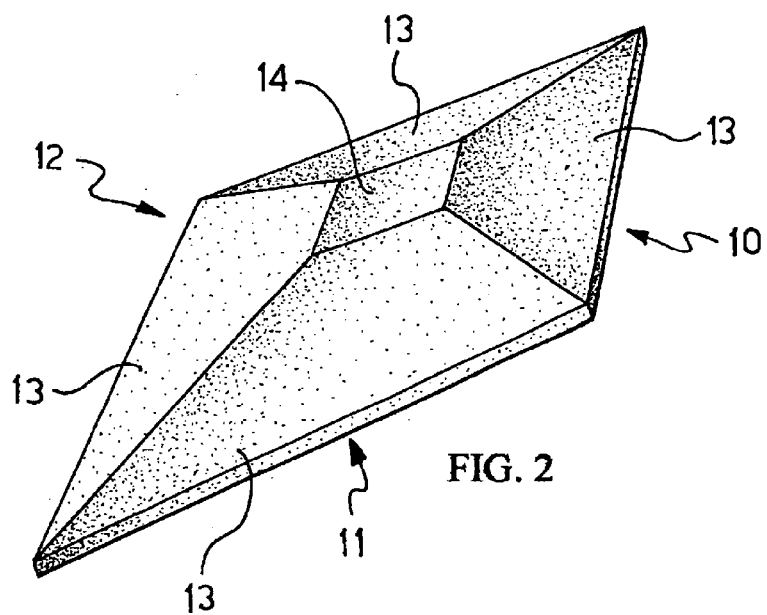
FIG. 2 shows a perspective view of a first embodiment of a refractive optical element according to the present invention.

In a first preferred embodiment of the refractive optical element 10 of the present invention, illustrated in FIG. 2, the four surface portions 13 are intersected so as to form a rhomboidal-base pyramidal structure, from which a portion is removed at the pyramid vertex. In the pyramidal structure, a plane surface portion 14 substantially perpendicular to the optical axis Z and/or parallel to the first face 11 is thus defined, adapted to collect a central portion of the collimated beam 5. The beam portions that intercept the four inclined surface portions 13 are deflected, and they identify the four margins of the reading area 100. The central beam portion that intercepts the plane surface portion 14, on the contrary, propagates without any deflection towards the reading area 100, so as to identify the center of the same area. In this embodiment, each side of the pyramid identifies the opposed vertex of the reading area 100.

Figure 12:
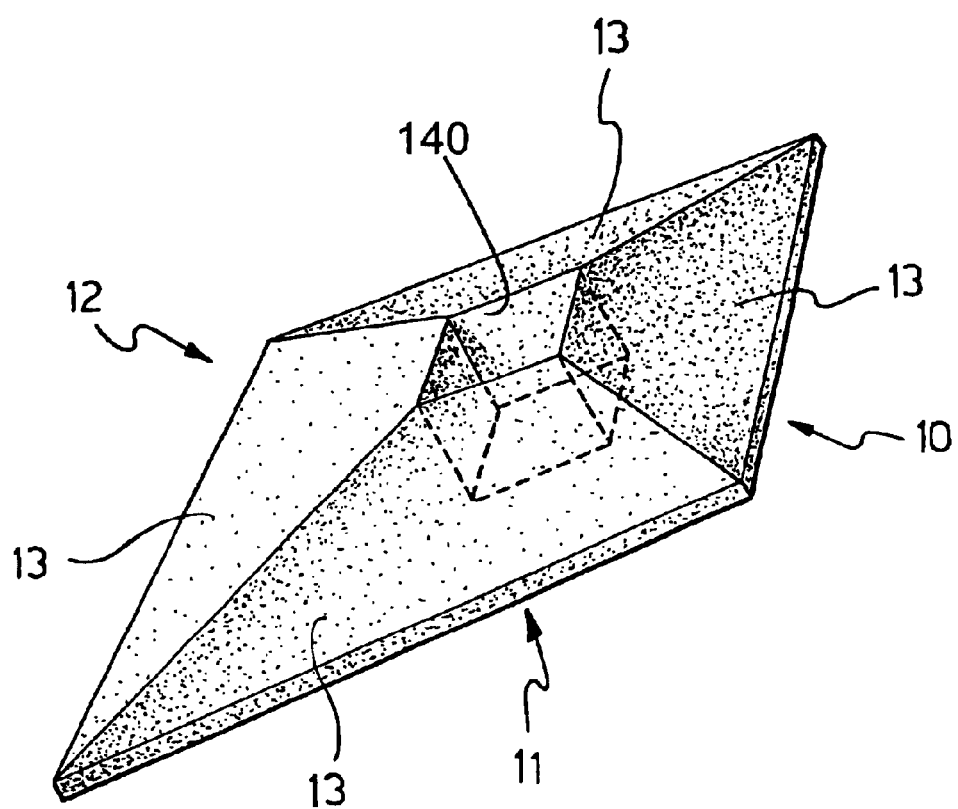
FIG. 12 shows a perspective view of another embodiment of a refractive optical element according to the present invention.

In an alternative embodiment of the optical element 10 of the invention shown in FIG. 12, the identification of the reading area 100 is achieved by providing, coaxially to said optical axis Z, a through hole between the first face 11 and the second face 12. The central beam portion that is collected by said hole remains undeflected, and identifies the center of the reading area 100.

Figure 4:
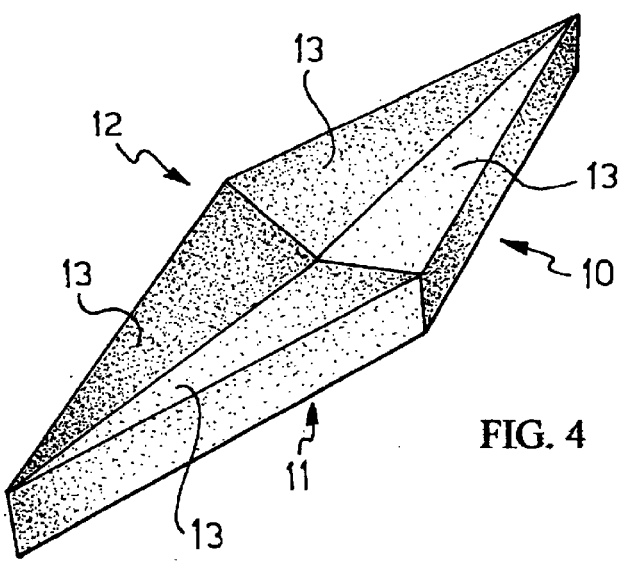
FIG. 4 shows a perspective view of a third embodiment of a refractive optical element according to the present invention.

In a further embodiment of the optical element 10 of the present invention, illustrated in FIG. 4, the four surface portions 13 are inclined by an angle equal to $-\alpha$ with respect to the first face 11 so as to form the negative of a pyramid. In the FIG. 4 embodiment, each surface portion 13 identifies the corresponding vertex of the reading area 100. Also in this case, a portion of plane surface 14 or a through hole can be centrally provided in the optical element 10, so as to transmit without any deflection the central portion of the collimated light beam 5 towards the reading area 100.

According to a further alternative embodiment of the optical element 10 of the present invention (not illustrated), no central hole nor portion of plane surface 14 is provided in the pyramidal structure of the refractive optical element 10 for allowing the propagation without any deflection of the central portion of the collimated light beam 5. However, it is possible to obtain a visual indication of the central zone of the reading area 100 by providing a collimated light beam 5 with a section greater than the input section of the refractive optical element 10. In this case, the beam portion exceeding the input section of the refractive optical element 10 proceeds without any deflection and identifies the center of the framed reading area, whereas the portions of central beam that impinge on the refractive optical element 10 are deviated so as to identify the margins of the reading area 100.

Figure 3:
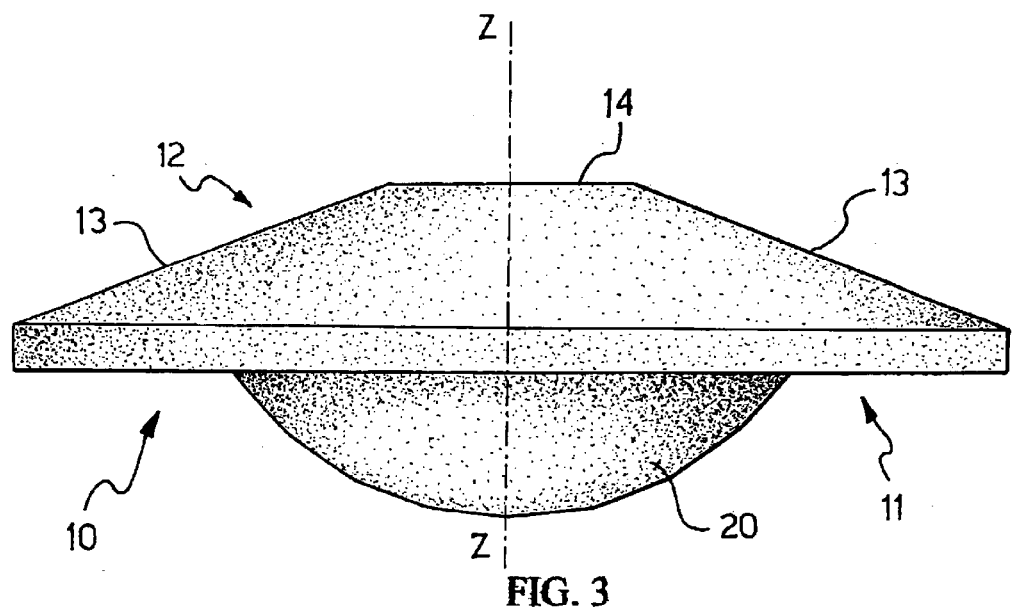
FIG. 3 shows a perspective view of a second embodiment of a refractive optical element according to the present invention.

As shown by way of example in FIG. 3, on the first face 11 of the refractive optical element 10 (whatever its embodiment) there can be fixedly integrated a collimation lens 20 adapted to collimate the light beam, which is then split into the various beam portions (deflected and undeflected) by the refractive optical element 10. Of course, in this case the light beam arriving to the refractive optical element 10 has not been previously collimated.

As already mentioned before, the aiming device of the invention, in a variant thereof, can be without any collimation lens, thus operating with an uncollimated light beam. Such device is capable of providing in any case a sufficiently clear and precise visual indication of the framed reading area, although for relatively small depths of field and with slightly out-of-focus spots generated on the reading area.

Figure 5:
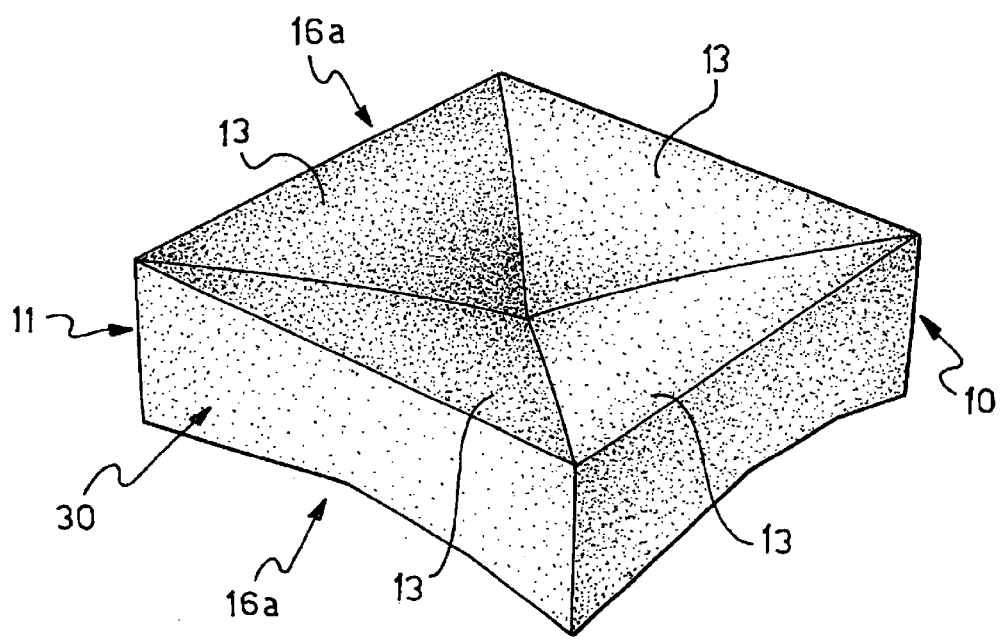
FIG. 5 shows a perspective view of a fourth embodiment of a refractive optical element according to the present invention.
Figure 6:
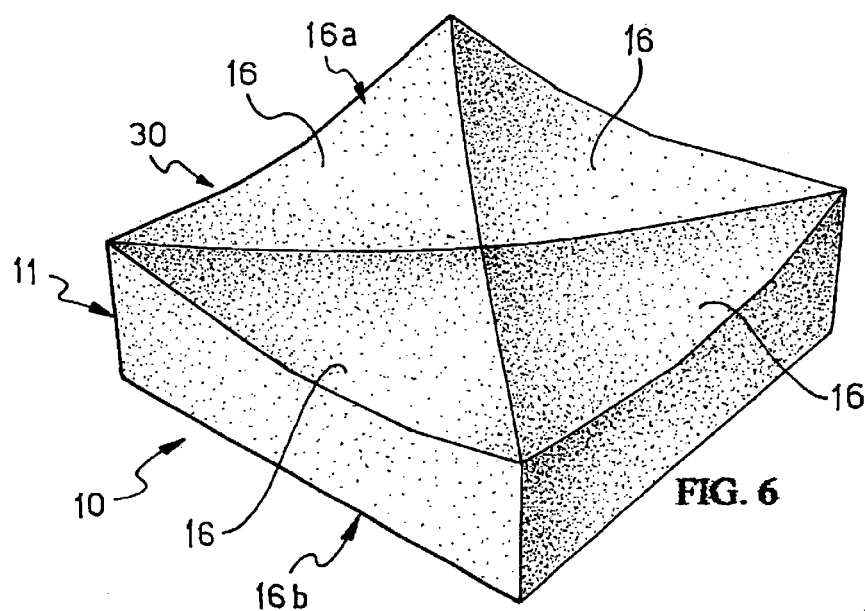
FIG. 6 shows a perspective view of the refractive optical element of FIG. 5, upside down.
Figure 7:
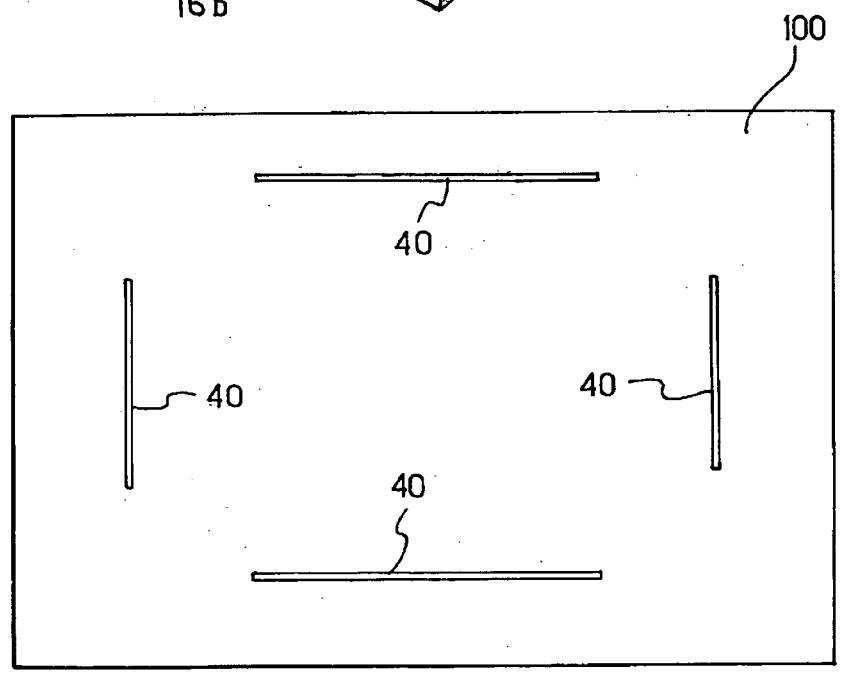
FIG. 7 shows a schematic view of the reading area framed through the optical element of FIG. 5.

According to an alternative embodiment of the refractive optical element 10 of the present invention, illustrated in FIGS. 5 and 6, the inclined surface portions 13 are substantially cylindrical and convex, instead of being plane. In this case, the first face 11 of the optical element 10 of the invention is integrally associated to another divergent optical element 30 comprising a plurality of diverging lenses 16, each one arranged upstream of each inclined surface portion 13 of the refractive optical element 10 (in particular, see FIG. 6). In substance, it is possible to realise (for example through a moulding process) a single optical element wherein there are defined, on a first face 16a for collecting the collimated light beam, the diverging lenses 16 and, on an opposed face 16b for transmitting the beam portions to the reading area 100, the inclined surfaces 13. Such an element allows generation, on the reading area 100, of four orthogonal lines 40, such as to identify substantially the entire edge of the same area, as illustrated in FIG. 7. In fact, the element, besides splitting the collimated light beam 5 into four portions (through the inclined surface portions 13), through lenses 16 deviates each beam portion in an orthogonal direction with respect to that in which it is deviated by the corresponding surface portion 13, so as to generate on the reading area 100 the four orthogonal lines 40, each one expanding along a side of the same area.

Figure 8:
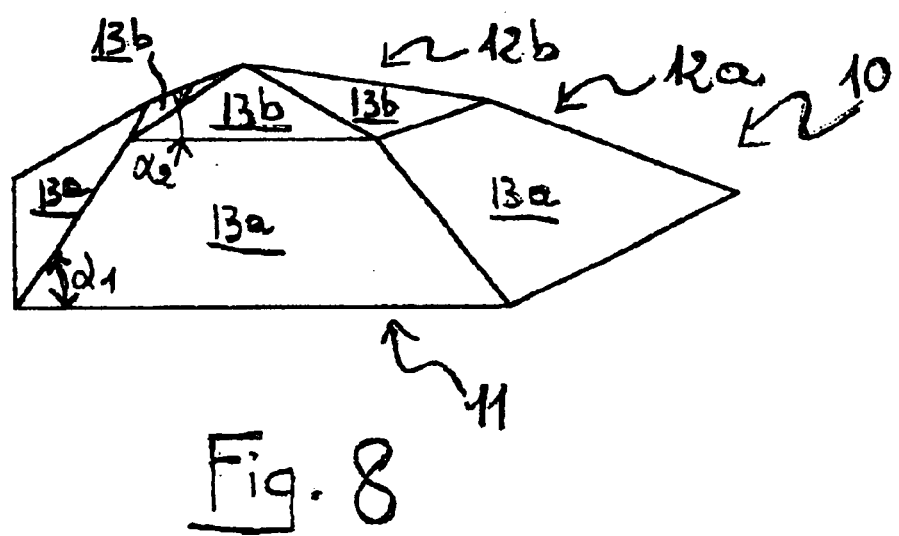
FIG. 8 shows a perspective view of a fifth embodiment of a refractive optical element according to the present invention.

According to a further alternative embodiment, illustrated in FIG. 8, the refractive optical element 10 of the present invention can comprise two superimposed pyramids with different face inclination, so as to realise two different deflection angles. The two different deflection angles provide identification of two different zones of the reading area, a more internal one (for smaller deflection angles) and a more external one (for larger deflection angles). In particular, in the second face 12 of the refractive optical element 10 there is defined a first peripheral annular portion 12a, provided with a plurality of surfaces 13a inclined by a predetermined angle $\alpha_1$ with respect to the first face 11, and a second central surface portion 12b provided with a plurality of surfaces 13b that are inclined, with respect to the first face 11, by an angle $\alpha_2$ that is smaller than $\alpha_1$. Surfaces 13a are adapted to deflect corresponding collimated light beam portions by a predetermined deflection angle $\beta_1$ with respect to the optical axis Z, whereas surfaces 13b are adapted to deflect corresponding collimated light beam portions by a predetermined deflection angle $\beta_2$, smaller than $\beta_1$, with respect to the optical axis Z. Thus, surfaces 13a are adapted to identify a more internal portion of the reading area 100, whereas surfaces 13b are adapted to identify a more external portion of the reading area 100.

Figure 9:
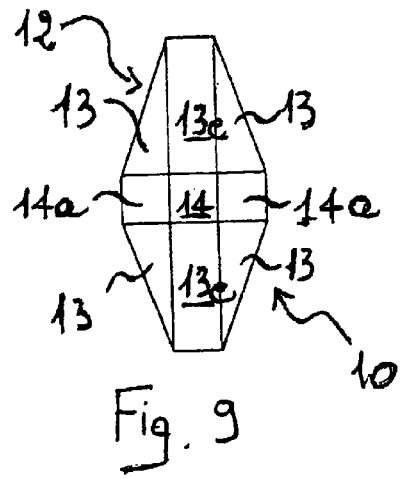
FIG. 9 shows a plan view of a sixth embodiment of a refractive optical element according to the present invention.
Figure 10:
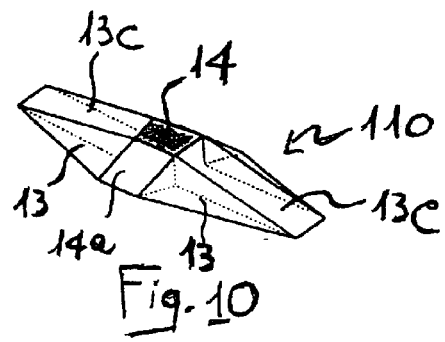
FIG. 10 shows a perspective view of the optical element of FIG. 9.

According to the present invention, by increasing the number of inclined surfaces of the face 12 of the refractive optical element 10 it is possible to increase the number of zones identified on the reading area 100. For example, FIGS. 9 and 10 show an embodiment of a refractive optical element 110 having a substantially pyramidal shape with an octagonal base. With the element 110 it is possible to identify nine different zones of the reading area 100. Element 110 comprises: (1) four surfaces 13 which are inclined with respect to face 11 for collecting the collimated light beam, adapted to identify the four vertices of the reading area, so as to identify a rectangle, (2) two surfaces 13c that are inclined with respect to face 11 and adapted to identify the median points of the outline of the reading area at the long side of the rectangle, (3) a central surface 14, parallel to face 11 and adapted to identify the centre of the reading area, and (4) two surfaces 14a, that are inclined with respect to face 11, and adapted to identify the median points of the outline of the reading area at the short side of the rectangle.

Figure 11:
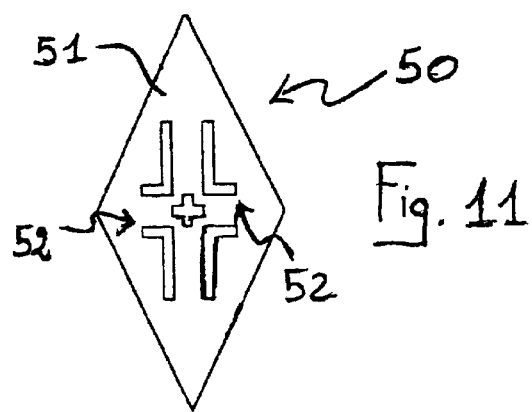
FIG. 11 shows a plan view of an amplitude mask for an aiming device according to the present invention.

In combination with all the embodiments of the optical element 10 of the invention described above, the aiming device of the invention can further comprise an amplitude mask 50 (of the conventional type) provided with an opaque surface 51. In such amplitude mask there are formed apertures 52, having a preselected shape, adapted to impart, to the various beam portions projected on the reading area 100, a predetermined profile. For example, the amplitude mask 50 illustrated in FIG. 11 generates, at the four vertices of the reading area 100, as many L-shaped edges, and a cross at the centre.

Preferably, the amplitude mask 50 is arranged between the emission source (and optionally, the collimation lens) and the refractive optical element 10. Nevertheless, there can be provided an embodiment of the aiming device of the invention wherein the amplitude mask 50 is arranged upstream of the optional collimation lens, although this requires a greater alignment difficulty.

In the operation, the operator aims the reader onto the area 100 containing the optical information to be read. By operating on a suitable actuation button (not shown), the aiming and/or visual indication device of the present invention is actuated: the luminous source emits a light beam that, once collimated, is collected by the refractive optical element 10. This generates a plurality of different beam portions that are projected on the reading area so as to identify the margins of a rectangle and its central zone. Thus, the operator moves the reader until the entire information to be read is confined inside the rectangle. Only at this point does the operator start the operations of acquiring the optical image diffused by the item containing the information, and reading it.

What is claimed is:

1. An aiming device for aiming and visually indicating a reading area of a coded information reader, comprising:
   means for emitting a light beam;
   means for deflecting at least one first portion of the light beam so as to generate at least two different beam portions active on at least two different zones of a reading area of a coded information reader along at least two different optical paths;
   wherein the means for deflecting at least one portion of the light beam consists of a refractive optical element;
   wherein the refractive optical element comprises first and second opposed faces for respectively collecting the light beam and projecting the at least two beam portions on the reading area, wherein an optical axis Z is defined into the refractive optical element;
   wherein said second face comprises four first surface portions, each of the four first surface portions being inclined by a predetermined angle with respect to the first face and adapted to deflect a corresponding portion of the light beam by a predetermined deflection angle with respect to the optical axis Z, so as to define, in the refractive optical element, a poly-prismatic structure having a substantially pyramidal shape with a rhomboidal base.

2. A device according to claim 1, further comprising means for collimating the light beam.

3. A device according to claim 1, wherein said means for emitting a light beam comprises a LED emitting a light beam.

4. A device according to claim 1, wherein the refractive optical element comprises means for transmitting without any deflection a second portion of the light beam towards the reading area.

5. A device according to claim 4, wherein the means for transmitting without any deflection the second portion of the light beam towards the reading area is provided centrally in the refractive optical element.

6. A device according to claim 1, wherein the refractive optical element comprises means for transmitting without any deflection a second portion of the light beam towards the reading area, and wherein the second face comprises at least one second surface portion which is substantially flat and parallel to the first face for collecting the light beam, the at least one second surface portion forming the means for transmitting without any deflection the at least one second portion of light beam towards the reading area.

7. A device according to claim 1, wherein the refractive optical element comprises means for transmitting without any deflection a second portion of the light beam towards the reading area, and wherein said refractive optical element comprises a through hole extended between the first and second faces and coaxially formed with respect to the optical axis Z, the through hole forming the means for transmitting without any deflection the at least one second portion of light beam towards the reading area.

8. A device according to claim 1, wherein the refractive optical element has a cross section smaller than that of the light beam.

9. A device according to claim 1, further comprising means for collimating the light beam, wherein the collimation means comprises a collimation lens fixedly associated with the refractive optical element at the first face for collecting the light beam.

10. A device according to claim 1, further comprising an amplitude mask adapted to impart a predetermined profile to the at least two different beam portions.

11. A device according to claim 10, further comprising means for collimating the light beam wherein the amplitude mask is arranged between the collimation means and the refractive optical element.

12. A device according to claim 1, wherein at least one of said inclined surface portions of the refractive optical element is substantially planar.

13. A device according to claim 1, wherein at least one of said inclined surface portions of the refractive optical element is substantially cylindrical and convex.

14. A device according to claim 13, comprising at least one diverging lens arranged upstream of the refractive optical element in correspondence to said at least one of said inclined surface portion.

15. An aiming device for aiming and visually indicating a reading area of a coded information reader, comprising:
   means for emitting a light beam;
   means for deflecting at least one first portion of the light beam so as to generate at least two different beam portions active on at least two different zones of a reading area of a coded information reader along at least two different optical paths;
   wherein the means for deflecting at least one portion of the light beam consists of a refractive optical element;
   wherein the refractive optical element comprises first and second opposed faces for respectively collecting the light beam and projecting the at least two beam portions on the reading area, wherein an optical axis Z is defined into the refractive optical element;
   wherein the second face comprises at least one first peripheral surface portion inclined by a predetermined angle $\beta_1$ with respect to the first face and adapted to deflect the at least one first portion of light beam by a predetermined deflection angle $\beta_1$ with respect to the optical axis Z, and at least one second surface portion proximate a center of the second face, the at least one second surface portion being inclined by a predetermined angle $\alpha_2$ different from $\alpha_1$, with respect to the first face and adapted to deflect the at least one portion of light beam by a predetermined deflection angle $\beta_2$, different from $\beta_1$, with respect to the optical axis Z.

16. An aiming device for among and visually indicating a reading area of an optical apparatus, the aiming device comprising:
   an emitter which emits a light beam;
   an optical element which splits the light beam into at least two different beam portions active on at least two different zones of the reading area of the optical apparatus along at least two different optical paths, wherein the optical element consists of a refractive optical element;
   wherein the refractive optical element comprises first and second opposed faces for respectively collecting the light beam and projecting the at least two beam portions on the reading area, wherein an optical axis Z is defined into the refractive optical element and the second face comprises at least one first surface portion inclined by a predetermined angle α with respect to the first face and adapted to deflect the at least one first portion of light beam by a predetermined deflection angle β with respect to the optical axis Z;

wherein said second face comprises four first surface portions, each of the four first surface portions being inclined by a predetermined angle with respect to th first face and adapted to deflect a corresponding portion of the light beam by a predetermined deflection angle with respect to the optical axis Z, so as to define, in the refractive optical element, a poly-prismatic structure having a substantially pyramidal shape with a rhomboidal base.

17. A device according to claim 16, wherein the refractive optical element also comprises means for transmitting without any deflection a second portion of the light beam towards the reading area.

18. A device according to claim 16, wherein the means for transmitting without any deflection the second portion of the light beam towards the reading area is provided centrally in the refractive optical element.

19. A device according to claim 16, wherein the refractive optical element has a cross section smaller than that of the light beam.

20. A device according to claim 16, wherein the second face comprises at least one first peripheral surface portion inclined by a predetermined angle $\alpha_1$ with respect to the first face and adapted to deflect the at least one first portion of light beam by a predetermined deflection angle $\beta_1$ with respect to the optical axis Z, and at least one second surface portion proximate a center of the second face, the at least one second surface portion being inclined by a predetermined angle $\alpha_2$ different from $\alpha_1$, with respect to the first face and adapted to deflect the at least one portion of light beam by a predetermined deflection angle $\beta_2$ different from $\beta_1$, with respect to the optical axis Z.

21. A device according to claim 16, further comprising an amplitude mask adapted to impart a predetermined profile to the at least two different beam portions.

22. A device according to claim 16, wherein the at least one first inclined surface portion of the refractive optical element is substantially planar.

23. A device according to claim 16, wherein the at least one first inclined surface portion of the refractive optical element is substantially cylindrical and convex.

24. A device according to claim 23, comprising at least one diverging lens arranged upstream of the refractive optical element in correspondence to the at least one first inclined surface portion.

25. An aiming device for aiming and visually indicating a reading area of an optical apparatus, the aiming device comprising:

an emitter which emits a light beam;

an optical element which splits the light beam into at least two different beam portions active on at least two different zones of the reading area of the optical apparatus along at least two different optical paths, wherein the optical element consists of a refractive optical element;

wherein the refractive optical element comprises first and second opposed faces for respectively collecting the light beam and projecting the at least two beam portions on the reading area, wherein an optical axis Z is defined into the refractive optical element and the second face comprises at least one first surface portion inclined by a predetermined angle ox with respect to the first face and adapted to deflect the at least one first portion of light beam by a predetermined deflection angle β with respect to the optical axis Z;

wherein the second face comprises at least one first peripheral surface portion inclined by a predetermined angle $\alpha_1$ with respect to the first face and adapted to deflect the at least one first portion of light beam by a predetermined deflection angle $\beta_1$ with respect to the optical axis Z, and at least one second surface portion proximate a center of the second face, the at least one second surface portion being inclined by a predetermined angle $\alpha_2$ different from $\alpha_1$, with respect to the first face and adapted to deflect the at least one portion of light beam by a predetermined deflection angle $\beta_2$, different from $\beta_1$, with respect to the optical axis Z.

26. An optical element for aiming and visually indicating a reading area of a coded information reader, comprising means for splitting light beam into at least two beam portions adapted to be projected on at least two different zones of a reading area along at least two different optical paths, wherein the optical element is a refractive optical element comprising at least two different surface portions which simultaneously collect the emitted light beam and which simultaneously project said at least two different beam portions onto said at least two different zones of the reading area;

wherein the refractive optical element comprises first and second opposed faces for respectively collecting the light beam and projecting the at least two beam portions on the reading area, wherein an optical axis Z is defined into the refractive optical element;

wherein said second face comprises four first surface portions, each of the four first surface portions being inclined by a predetermined angle with respect to the first face and adapted to deflect a corresponding portion of the light beam by a predetermined deflection angle with respect to the optical axis Z, so as to define, in the refractive optical element, a poly-prismatic structure having a substantially pyramidal shape with a rhomboidal base.

27. An optical apparatus according to claim 26, wherein the refractive optical element comprises means for transmitting without any deflection a portion of the light beam towards the reading area.

28. An optical apparatus for reading information in a reading area, the optical apparatus comprising an aiming device, the aiming device having:

an emitter which emits a light beam;

a refractive optical element which splits the light beam into at least two different beam portions active on at least two different zones of a reading area of the optical apparatus along at least two different optical paths, wherein the refractive optical element comprises at least two different surface portions which simultaneously collect the emitted light beam and which simultaneously project said at least two different beam portions onto said at least two different zones of the reading area;

wherein the refractive optical element comprises first and second opposed faces for respectively collecting the light beam and projecting the at least two beam portions on the reading area, wherein an optical axis Z is defined into the refractive optical element;

wherein said second face comprises four first surface portions, each of the four first surface portions being inclined by a predetermined angle with respect to the first face and adapted to deflect a corresponding portion of the light beam by a predetermined deflection angle with respect to the optical axis Z, so as to define, in the refractive optical element, a poly-prismatic structure having a substantially pyramidal shape with a rhomboidal base.

* * * * *